United States Patent Office 3,466,188
Patented Sept. 9, 1969

---

3,466,188
METHODS AND MATERIALS FOR INHIBITING CORROSION
Robert R. Annand, St. Louis, Mo., and Norman Hackerman, Austin, Tex., assignors to Tracor, Inc., Austin, Tex., a corporation of Texas
No Drawing. Continuation-in-part of application Ser. No. 323,504, Nov. 13, 1963. This application July 26, 1965, Ser. No. 474,942
Int. Cl. B44d 1/34
U.S. Cl. 117—132         31 Claims

ABSTRACT OF THE DISCLOSURE

The corrosion inhibiting activity of a polymerizable material, such as vinylpyridine, can be enhanced by polymerizing the material to form a longer chain material, such as poly(vinylpyridine), before using the material as a corrosion inhibitor.

---

This application is a continuation-in-part of a prior application Ser. No. 323,504, filed Nov. 13, 1963, and entitled "Method of Inhibiting Corrosion."

The invention relates to methods and materials suitable for inhibiting corrosion of a material subject thereto, and particularly concerns the inhibition of corrosion of metals, such as ferrous metals, aluminum, copper, brass, solders, and the like.

It has been discovered that a molecule with a plurality of adsorptively active sites, thereby being capable of bonding to a surface subject to corrosion, such as to a metal surface by chemisorption, exhibits good corrosion inhibition. The inhibition is frequently markedly improved when compared with a molecule containing only one such site. For example, a polymer consisting of a chain of inhibitively active chemical units all tied together can exhibit marked superiority over a monomer of the chemical unit.

Further, it has been found that a polymer having a chain about 250 units long possesses in general only slightly better inhibitive characteristics than one with a chain 10 to 20 units long, both of which can exhibit inhibitive characteristics several orders of magnitude better than the corresponding monomer. Thus, because of solubility characteristics, a polymer containing between 2 and about 20 units is preferred for treatment of corrosive aqueous solutions, although a polymer of between 2 and about 40 monomeric units may be considered as preferable for corrosive solutions in general depending of course on the nature of the corrosive solution.

The longer chain polymers containing up to about 250 chain units, however, may frequently be sufficiently soluble or emulsifiable for treatment of solutions, and in any event may be coated over a material, such as by painting, dipping, or spraying the polymer dissolved in suitable solvent, to provide protection against corrosion. In general, a polymer in accordance with the invention for use as a corrosion inhibitor should have a molecular weight less than about 25,000, as determined on a vapor phase osmometer, such as a mechrolab osmometer.

Improved corrosion inhibition may be obtained in accordance with the invention by polymerizing monomers, at least one of which has a polymerizable moiety and at least one adsorptively active group attached to the moiety, sufficiently to form a polymer having a plurality of adsorptively active groups attached to the chain thereof as substituents, and applying the polymer in a corrosion-inhibiting amount to a material subject to corrosion. Further, this polymer may be modified to improve its characteristics by changing the valence of the adsorptively active element in the adsorptively active group by subsequent oxidation or reduction with a substance having suitable properties for the particular purpose. The polymer can also be modified in other ways, such as by alkylation, to effect desirable properties in the resultant adsorptively active derivative.

Polymers particularly effective for corrosion inhibition are those which are the product of polymerization of polymerizable olefinic unsaturation, that is, addition polymerization. Thus, these polymers comprise a carbon chain having as substituents thereon a plurality of adsorptively active groups. Preferably, for purposes of inhibition this type of polymer contains at least 6 carbons in the carbon chain with at least three adsorptively active groups bonded to the chain.

The adsorptively active groups preferably contain at least one adsorptively active element from the class of nitrogen and sulfur, but may contain other suitable adsorptively active elements. For example, imino, amino, nitrilo, aromatic nitrogen, sulfonyl, sulfinyl, thio including mercapto, and thiocarbonyl as well as other adsorptively active groups may be employed in accordance with the invention. Of course, some of the above-mentioned groups must be employed in combination with other groups, such as alkyl, alkylene, or aryl, to satisfy valence or other requirements in order to bond to the carbon chain as a substituetent in a stable state, but these techniques will be apparent to persons in the art in view of the disclosure herein.

For example, thio may be present as a part of alkylthio or arylthio; sulfonyl and sulfinyl may be present as a part of sulfoalkyl and sulfinoalkyl, sulfophenyl and sulfinophenyl, alkylsulfony and aklylsulfinyl, or phenylsulfonyl and phenylsulfinyl; thiocarbonyl as a part of a thiocarboxyl, thioacyl, or alkylthiothiocarbonyl attached directly to the carbon chain, or attached indirectly through hydrocarbon groups (hydrocarbyl) and the like; mercapto as a part of mercaptoalkyl or mercaptophenyl; amino as a part of aminoalkyl, aminocarbonyl, or aminophenyl; imino as a part of a ring with methylene groups, one of which is bonded to the carbon chain, such as piperidyl; nitrilo as a part of cyano or cyanoalkyl; and aromatic nitrogen as a ring member of a cyclic group, such as pyridyl. For inhibition of aqueous solutions, it is preferable for the adsorptively active groups to be free of oxygen, except for the sulfoxides such as alkylsulfinyl and arylsulfinyl.

Of course, groups which harm the inhibitive activity of the corrosion inhibitor should be avoided. In this regard, however, one should remember that a group which by itself tends to interfere with inhibition may enhance the inhibitive activity of the overall inhibitor by adding or modifying another characteristic, such as solubility, which is desirable in a particular environment.

In general, the polymers produced from olefinic unsaturation will contain the following recurrent structural unit:

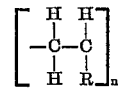

wherein $n$ is a number from about 3 to about 250, preferably about 3 to about 20, and R is an adsorptively active group as discussed above. Such polymers may be produced at least in part by addition polymerization of a monomer containing a vinyl moiety. For example 4-vinylpyridine can polymerize to poly(vinylpyridine). Poly(vinylpyridine) can be hydrogenated to poly(vinylpiperidine).

It is also feasible to polymerize a monomer containing a vinylene moiety, in which case the recurrent unit would contain a substituent on each chain carbon in the unit. Of course, both of the substituents can be adsorptively active groups, or one may be adsorptively active while the other is adsorptively inert, such as in the case of alkyl or phenyl. Further, the chain carbons may contain additional groups thereon, that is, two substituents on a single chain carbon.

Copolymers made in accordance with the invention are also useful in inhibiting corrosion. For example, 4-vinylpyridine and methyl acrylate, acrylamide, or acrylonitrile can be copolymerized to form a corrosion-inhibiting molecule. Styrene sulfonic acid (acid in 2 or 4 position probably) is also a useful monomer in respect to the invention. Likewise, monomers without adsorptively active groups, such as ethylene and styrene, can be copolymerized with monomers having adsorptively active groups to form a corrosion-inhibiting molecule having a plurality of adsorptive sites. In addition, the polymer once made can be modified by suitable techniques, for example, hydrolysis, oxidation, or hydrogenation, to effect desirable characteristics. Of course, the bonding power per unit weight in some instances may be reduced, but to attain certain characteristics, such as solubility in a particular environment, these techniques may be advantageously employed.

Although persons in the art will understand that particular groups for presence directly on the carbon chain, or in an adsorptively active group which is a substituent on the chain, are preferably selected with a view towards use in a particular corrosive environment, the selection may be made, for example, from the following groups, which are representative of the broad classes of groups which may be employed, assuming of course that valence requirements in the final product are satisfied:

| | |
|---|---|
| methyl | xylyl |
| ethyl | methylene |
| propyl | nonoxycarbonyl |
| butyl | ethenyl |
| octyl | butenyl |
| dodecyl | cyclohexyl |
| hexadecyl | octylcyclohexyl |
| octadecyl | ethylene |
| phenyl | propylene |
| tolyl | butylene |
| methylcarbonylmethyl | octylene |
| butylcarbonylethyl | dodecylene |
| nonylcarbonylmethyl | phenylene |
| methoxycarbonyl | chloro |
| butoxycarbonyl | bromo |
| p-chlorophenyl | iodo |
| p-bromophenyl | carboxyl |
| p-iodophenyl | cycloheptyl |
| methoxymethyl | cyclohexenyl |
| butoxymethyl | acetyl |
| nonoxymethyl | hydroxy |
| nonoxybutyl | tetracosyl |
| dodecylphenyl | |

Broadly, alkyl, alkylene, aryl, alkoxyalkyl, arylene, halo, carboxyl, alkoxycarbonyl, alkenyl, cycloalkyl, cycloalkenyl, acyl, alkylcarbonylalkyl, and hydroxy may be advantageously employed, particularly upon consideration of the intended corrosive environment. In general, a substituent on the carbon chain may contain up to about 24 carbons or more.

Particularly effective inhibitors are poly(vinylpyridine), poly(vinylpiperidine), poly(vinylpyridine-acrylic acid), and poly(vinylpyridine-methyl acrylate). Excellent inhibiting characteristics have been observed in the polymers containing a derivative group of a heterocyclic nitrogen compound, such as vinylpiperidine, vinylpyridine, and the vinylalkylenimines in general, and polymers (which term includes copolymers) containing at least one, preferably at least 5, of these groups for every 20 carbons in the carbon chain are preferred compounds for protection of materials subject to corrosion.

Although several methods of preparation of the polymers described herein will be apparent to those skilled in the art, addition polymerization in general can be carried out in ethanol at high dilution and under nitrogen with slow addition of initiator until a low ratio of initiator to monomer is established. Appropriate alteration of the dilution or of the monomer to initiator ratio can regulate the resultant molecular weights. 2,2'-azo(bis)isobutyronitrile can be employed as an initiator.

The following examples illustrate the invention more specifically.

Example I

Clean, weighed mild steel coupons were immersed in different vessels each of which contained 3 N HCl at 40° C. The control vessels contained varying concentrations of 4-ethylpyridine (monomeric control inhibitor) and the test vessels were divided into groups containing varying concentrations of poly(vinylpyridine).

After a two-hour period, the coupons were removed from the acid, washed thoroughly with water, rinsed with acetone, briefly dried under an infrared lamp, and weighed. From the measured area of the coupons and weight loss, a corrosion rate was derived and the inhibitor efficiency was obtained from the difference between the rate for the inhibited solution and that for uninhibited acid divided by the rate for the uninhibited acid. Gas evolution curves taken over the two-hour corrosion period established that the rate was constant. The results are shown in Table I below.

TABLE I.—CORROSION INHIBITION OF MILD STEEL BY POLY(VINYLPYRIDINE) COMPARED WITH INHIBITION BY 4-ETHYLPYRIDINE IN 3. ON HCl AT 40°C.

| Compound | Conc. (g./l.) | Percent inhibition |
|---|---|---|
| Monomer (4-ethylpyridine) | 100 | 82 |
| Monomer | 10 | 44 |
| Polymer (M.W. 1,160) | 10 | 82 |
| Monomer | 1 | 3 |
| Polymer (M.W. 1,160) | 1 | 82 |
| Polymer (M.W. 25,000) | 1 | 92 |
| Monomer | 0.5 | (1) |
| Polymer (M.W. 1,160) | 0.5 | 82 |
| Polymer (M.W. 25,000) | 0.5 | 90 |
| Monomer | 0.1 | (1) |
| Polymer (M.W. 1,160) | 0.1 | 82 |
| Polymer (M.W. 25,000) | 0.1 | 90 |
| Monomer | 0.01 | (2) |
| Polymer (M.W. 1,160) | 0.01 | 82 |
| Polymer (M.W. 25,000) | 0.01 | 88 |
| Monomer | 0.001 | (2) |
| Polymer (M.W. 1,160) | 0.001 | 44 |

[1] Accelerates corrosion.
[2] No effect.

Example II

Employing the procedure outlined in Example I another control inhibitor (4-ethylpiperidine) was compared with poly(vinylpiperidine).

Again, after a two-hour period, the coupons were removed from the acid, washed thoroughly with water, rinsed with acetone, briefly dried under an infrared lamp, and weighed. From the measured area of the coupons and the weight loss, a corrosion rate was derived and the inhibitor efficiency was obtained from the difference between the rate of the inhibited solution and that for uninhibited acid solution divided by the rate for the uninhibited acid solution. Gas evolution curves taken over the two-hour corrosion period established that the rate was constant. The results are shown in Table II below.

TABLE II.—CORROSION INHIBITION OF MILD STEEL BY POLY(VINYLPIPERDINE) COMPARED WITH 4-ETHYL-PIPERIDINE IN 3. ON HCl AT 40° C.

| Compound | Conc. (g./l.) | Percent inhibition |
|---|---|---|
| Monomer | 100 | 87 |
| Monomer | 10 | 63 |
| Polymer (M.W. 400) | 10 | 98 |
| Monomer | 5 | 52 |
| Polymer (M.W. 400) | 5 | 98 |
| Monomer | 1 | 41 |
| Polymer (M.W. 400) | 1 | 98 |
| Monomer | 0.1 | 11 |
| Polymer (M.W. 400) | 0.1 | 93 |
| Monomer | 0.01 | (1) |
| Polymer (M.W. 400) | 0.01 | 87 |
| Monomer | 0.001 | (2) |
| Polymer (M.W. 400) | 0.001 | 62 |
| Monomer | 0.0001 | (2) |
| Polymer (M.W. 400) | 0.0001 | 27 |

[1] Accelerates corrosion.
[2] No effect.

Example III

Poly(vinylpyridine) having a molecular weight of 1,200 was dissolved in a mixture of dimethylformamide and dimethylsulfoxide to form a concentrated solution, and mild steel coupons were dipped into the solution. After removal, the coupons were rinsed with water and then immersed in an aerated 3.5% by weight aqueous solution of sodium chloride. The coating was so thin as to be undetectable by visual examination. Corrosion test results are shown in Table III below, wherein the inhibitor efficiency was obtained from the difference between the corrosion rate for the inhibited solution and that for an uninhibited solution divided by the rate for the uninhibited solution.

Table III.—Corrosion date for poly(vinylpyridine) coated steel shimstock coupons in aerated 3.5% NaCl solution at 30° C.

| Time of exposure (days) | Inhibitor efficiency, percent |
|---|---|
| 1/12 | 52.5 / 32.8 |
| 3/4 | 42.0 / 47.6 |
| 1 | 18.8 |
| 3 | 26.2 |
| 5 | 62.3 |
| 11 | 51.8 |
| 13 | 27.3 |
| 15 | 47.8 |
| 21 | 30.0 |
| Average | 40.0 |

Average rate inhibited: 22.6 milligrams/decimeter²/day
Average rate uninhibited: 39.7 milligrams/decimeter²/day.

Example IV

A copolymer of a 50–50 mole ratio of 4-vinylpyridine and methyl acrylate was prepared, and the acrylate groups were then hydrolyzed to the acid. The polymer thus produced was then tested for inhibiting characteristics with respect to mild steel in 3 N HCl at 35° C. The results are shown in Table IV below.

Table IV.—Corrosion of mild steel in 3 N HCl at 35° C. inhibited with poly(vinylpyridine-acrylic acid)

| Rate, MDD[1] | Inhibitor and conc., wt. percent |
|---|---|
| 4,000 | None |
| 600 | copolymer 0.1 |
| 800 | do 0.01 |

[1] MDD—Milligrams/decimeter² day.

Example V

The inhibiting characteristics of poly(vinylpyridine) with respect to corrosion of aluminum in 1 N HCl at 35° C. was tested, and the results are shown n Table V below.

Table V.—Corrosion of aluminum in 1 N HCl at 35° C. inhibited with poly(vinylpyridine)

| Rate, MDD[1] | Inhibitor and conc., wt. percent |
|---|---|
| 520 | poly(vinylpyridine), 0.001 |
| 235 | poly(vinylpyridine), 0.01 |
| 17,600 | None |

[1] MDD—Milligrams/decimeter² day.

Example VI

The inhibiting characteristics of poly(vinylpyridine) and poly(vinylpyridine-acrylic acid) with respect to aluminum in 3 N HCl at 35° C. was tested, and the results are shown in Table VI below.

Table VI.—Corrosion tests of aluminum in 3N HCl at 35° C.

| Rate, MDD[1] | Inhibitor and conc., wt. percent |
|---|---|
| 309,000 | None |
| 92,400 | Poly(vinylpyridine), 0.001 |
| 2,000 | Poly(vinylpyridine), 0.1 |
| 84,000 | Copolymer, vinylpyridine, acrylic acid, 0.01 |
| 8,000 | Copolymer, vinylpyridine, acrylic acid, 0.1 |

[1] MDD—milligrams/decimeter²/day.

Example VII 10 grams, NaOH, 50 grams laurylmercaptan, and 46 grams lauryl amine were dissolved in methanol, and 43 grams chlorinated paraffin (43% by weight chlorine, m.w. 660) was added. The mixture was refluxed 24 hrs., the methanol evaporated, and the product dissolved in benzene. The benzene was evaporated, and about 120 grams of brown solid product was obtained. The unit structure may be represented as:

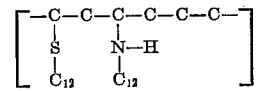

with the dodecylthio and dodecylamino groups at random on the chain, possibly with a few chlorines still bonded to the chain.

The product was employed as a corrosion inhibitor in a wheel corrosion inhibitor evaluation test. The inhibitor was dissolved in an aromatic solvent, and an amount of the dissolved inhibitor was added to 131 milliliters of brine and 56 milliliters of kerosene sufficient to form an inhibitor concentration of 100 p.p.m. The brine was formed of 50 grams NaCl and 0.5 milliliter of acetic acid per liter of distilled water. Corrosion results with regard to steel coupons at a temperature of 175° F. with $H_2S$ gas in solution were obtained. Corrosion in the control solution without the inhibitor averaged 51.9 milligrams after 24 hours whereas corrosion in the inhibited solution averaged 8.4 milligrams, the inhibitor efficiency being 83% under stringent conditions.

This test illustrates the effectiveness of an inhibitor in accordance with the invention. For example, in contrast laurylethylsulfide in the same test exhibited an average inhibitor efficiency of 3%.

Example VIII 100 grams lauryl mercaptan and 20 grams NaOH were dissolved in methanol, and 43 grams chlorinated paraffin was added. After heating at reflux for 48 hours, the methanol was evaporated, and the resulting product extracted with hot benzene. 29 grams of benzene-soluble product, estimated to have a chain length of about 26 carbons, was obtained. A representative unit formula is:

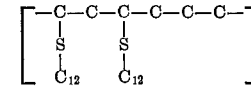

with the dodecylthio groups at random on the chain, possibly with chlorine atoms still present.

Test of this product by the procedures outlined in Example VII indicates that the product has an inhibitor efficiency of about 12.5% in the particular environment stated.

Example IX

Hexanethiol, 24 gr., and NaOH, 8 grams, are dissolved in 200 ml. of methanol. Chlorinated paraffin, 16 grams, 43% Cl, is added and the mixture heated to reflux and stirred for 24 hours. The methanol solvent is then evaporated and the intermediate product is dissolved in 200 ml. of benzene, and filtered to remove sodium chloride. A representative unit formula of the product is:

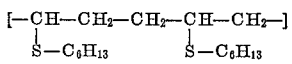

A solution of 32 grams bromine and 16 grams sodium hydroxide in 200 ml. of water is prepared, cooled to zero degrees C. and stirred into the cold, 0° C. benzene solution of the intermediate. After stirring 12 hours, the benzene is evaporated, the aqueous phase is extracted with chloroform and the dried chloroform is evaporated to recover the sulfoxide product. A representative unit formula of the product is:

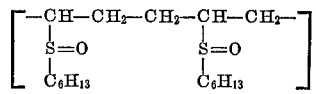

The product was tested as a corrosion inhibitor for mild steel in 3 N HCl and found to be very effective.

Table VII.—Corrosion inhibition tests of sulfoxide as to mild steel in 3 N HCl at 35° C., four hours

| Conc., p.p.m. | Percent inhibition |
| --- | --- |
| 1 | 40 |
| 10 | 80 |
| 100 | 95 |
| 1000 | 97 |

Oxidants other than hypobromite can be used, such as hypochlorite and hydrogen peroxide. Other materials or mixtures yielding mild oxidizing agents are also effective. The preferred temperature range for oxidation is between about −20° to +20° C.

Example X

The product of reaction of Example VIII is oxidized to the corresponding sulfoxide product in accordance with procedures outlined in Example IX to obtain a long chain hydrocarbon having a plurality of laurylsulfinyl groups thereon as substituents. The product can possess very effective corrosion inhibitive properties.

Similarly, the valence state of adsorptively active elements in other corrosion inhibitors may be adjusted to improve inhibitive characteristics. From the disclosure herein, persons in the art will understand that substances having properties sufficient to change the valence of the adsorptively active element and form a desired adsorptively active compound can be selected from conventional substances employed for oxidation or reduction purposes. For example, nitro groups can be reduced to amino by reaction with hydrogen.

As the above test results indicate, polymers having a plurality of adsorptively active sites can exhibit very good corrosion-inhibitive properties when applied to an object in a corrosion-inhibiting amount, either by treatment of the corrodant or direct coating of the object to be protected. It should also be noted that such polymers are much more effective than the monomers representing a single polymer unit, even when compared on a weight basis. In general, an inhibitive polymer may be added to a corrodant in an amount between about $10^{-5}$ and about 10% by weight based on the weight of the corrodant to provide acceptable corrosion inhibition.

In other tests it was found that when the polymers are not readily soluble in the corrodant, effective inhibition can still be obtained by emulsification of the corrodant and the inhibitor. The polymer may also be employed along with other inhibitors to provide a combination of characteristics for particular uses, and may be employed in either acidic, alkaline, or neutral salt corrodants.

What is claimed is:

1. A method for improving corrosion inhibition of a metal subject to corrosion, which method comprises polymerizing olefinic unsaturation of monomers, at least one of said monomers having a polymerizable olefinic moiety and at least one adsorptively active group attached to said moiety, sufficiently to form a linear polymer having a carbon chain composed of at least six carbons and having a plurality of adsorptively active groups attached to the chain thereof as substituents, applying, without curing, one of the class consisting of said polymer and adsorptively active derivatives thereof to said metal in a corrosion-inhibiting amount, said adsorptively active group being adsorptively active with respect to said metal; and exposing said metal to a corrosive environment such that said polymer or its adsorptively active derivatives inhibits corrosion.

2. The method defined in claim 1 wherein said monomers are polymerized sufficiently to form a polymer having from 2 to about 40 recurrent units.

3. The method defined in claim 1 wherein said adsorptively active group contains at least one adsorptively active element selected from the class consisting of nitrogen and sulfur, and said polymer has a molecular weight less than about 25,000.

4. The method defined in claim 1 wherein said adsorptively active group contains adsorptively active nitrogen, and said polymer has a molecular weight less than about 25,000.

5. The method defined in claim 1 wherein said adsorptively active group contains at least one group selected from the class consisting of imino, amino, nitrilo, aromatic nitrogen, thio, sulfonyl, sulfinyl, and thiocarbonyl, and said polymer has a molecular weight less than about 25,000.

6. A method for inhibiting corrosion of a metal subject thereto, which method comprises applying without curing to said metal, in a corrosion-inhibiting amount, at least one of the class consisting of linear polymers having a carbon chain composed of at least six carbons and having a plurality of adsorptivley active groups attached to the chain thereof as substituents, said polymers being polymeric products of olefinic unsaturation of monomers, each of said monomers having a polymerizable olefinic moiety and at least one of said monomers having a least one adsorptively active group attached to said moiety, said adsorptively active group being adsorptively active with respect to said metal; and adsorptively active derivatives of said polymers; and exposing said metal to a liquid corrodant such that said polymer or its adsorptively active derivatives inhibit corrosion.

7. The method defined in claim 6 wherein said polymers are the product of polymerization of olefinic unsaturation having from 2 to about 40 recurrent units.

8. The method defined in claim 7 wherein said polymers are composed of

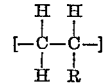

as a recurrent structural unit, wherein R represents an adsorptively active group.

9. The method defined in claim 6 wherein said adsorptively active groups each contain at least one adsorptively active element selected from the class consisting of nitrogen and sulfur, and each of said polymers has a molecular weight less than about 25,000.

10. The method defined in claim 6 wherein said adsorptively active groups each contain at least one group selected from the class consisting of imino, amino, nitrilo, aromatic nitrogen, thio, sulfonyl, sulfinyl, and thiocarbonyl, and each of said polymers has a molecular weight less than about 25,000.

11. A method for inhibiting corrosion of a metal subject thereto, which method comprises dispersing in the corrosive environment of said metal, in a corrosion-inhibiting amount, at least one of the class consisting of linear polymers having a carbon chain of at least six carbons and having as substituents on said chain a plurality of adsorptively active groups each containing at least one adsorptively active element selected from the class consisting of nitrogen and sulfur, said adsorptively active groups being adsorptively active with respect to said metal, said polymers being polymeric products of olefinic unsaturation of monomers, each of said monomers having a polymerizable olefinically unsaturated moiety and at least one of said monomers having at least one adsorptively active group attached to said moiety; and adsorptively active derivatives of said polymers.

12. The method defined in claim 11 wherein said adsorptively active element is nitrogen.

13. A method for inhibiting corrosion of a metal subject thereto, which method comprises dispersing in the corrosive environment of said metal, in a corrosion-inhibiting amount, at least one linear polymer having a carbon chain of at least 6 carbons and having as substituents on said chain a plurality of adsorptively active groups each containing at least one group selected from the class consisting of imino, amino, nitrilo, aromatic nitrogen, thio, sulfonyl, sulfinyl, and thiocarbonyl; said adsorptively active groups being adsorptively active with respect to said metal; said polymer being the polymeric product of olefinic unsaturation of monomers, each of said monomers having a polymerizable olefinically unsaturated moiety and at least one of said monomers having at least one adsorptively active group attached to said moiety.

14. The method for inhibiting corrosion of a metal subject thereto, which method comprises applying without curing to said metal, in a corrosion-inhibiting amount, at least one linear polymer having a carbon chain composed of at least 6 carbons and having as substituents on said chain at least three cyclic groups having carbon and nitrogen as ring members and being bonded to said chain through a carbon; said cyclic groups being adsorptively active with respect to said metal; and exposing said metal to a corrosive environment such that said polymer inhibits corrosion.

15. A method for inhibiting corrosion of a metal subject thereto, which method comprises applying without curing to said metal, in a corrosion-inhibiting amount, at least one linear polymer having a carbon chain composed of at least 6 carbons and having as substituents on said chain at least three pyridyl groups; said pyridyl groups being adsorptively active with respect to said metal; and exposing said metal to a corrosive environment such that said polymer inhibits corrosion.

16. A method for inhibiting corrosion of a metal subject thereto, which method comprises applying without curing to said metal, in a corrosion-inhibiting amount, at least one linear polymer having a carbon chain composed of at least 6 carbons and having as substituents on said chain at least three piperidyl groups; said piperidyl groups being adsorptively active with respect to said metal; and exposing said metal to a corrosive environment such that said polymer inhibits corrosion.

17. A method for inhibiting corrosion of a metal subject thereto, which method comprises applying without curing to said metal, in a corrosion-inhibiting amount, poly(vinylpyridine); and exposing said metal to a corrosive environment such that said poly(vinylpyridine) inhibits corrosion.

18. A method for inhibiting corrosion of a metal subject thereto, which method comprises applying without curing to said metal, in a corrosion-inhibiting amount, poly(vinylpiperidine); and exposing said metal to a corrosive environment such that said poly(vinylpiperidine) inhibits corrosion.

19. A method for inhibiting corrosion of a metal subject thereto, which method comprises applying without curing to said metal, in a corrosion-inhibiting amount, a copolymer of vinylpyridine and acrylic acid; and exposing said metal to a corrosive environment such that said copolymer inhibits corrosion.

20. A method for inhibiting corrosion of a metal subject thereto, which method comprises applying without curing to said metal, in a corrosion-inhibiting amount, a copolymer of vinylpyridine and methyl acrylate; and exposing said metal to a corrosive environment such that said copolymer inhibits corrosion.

21. A method for inhibiting corrosion of a metal subject thereto, which method comprises applying without curing to said metal, in a corrosion-inhibiting amount, at least one linear polymer having a chain composed of at least 6 carbons and having as substituents on said chain at least three adsorptively active groups, at least five of said adsorptively active groups for every 20 chain carbons being a cyclic group having carbon and nitrogen as ring members and being bonded to said chain through a carbon; and exposing said metal to a liquid corrodant such that said polymer inhibits corrosion.

22. A method for inhibiting corrosion of a metal subject thereto, which method comprises dispersing in the corrosive environment of said metal, in a corrosion-inhibiting amount, at least one linear polymer having a carbon chain of at least 6 carbons and having a plurality of adsorptively active groups attached to the chain thereof as substituents, said groups containing nitrogen as an adsorptively active element; said nitrogen being present as and being selected from at least one of the class consisting of imino, amino, nitrilo, and aromatic nitrogen.

23. The method defined in claim 22 wherein said polymer is poly(vinylpiperidine).

24. A method for improving inhibition of a metal subject to corrosion, which method comprises polymerizing olefinic unsaturation of monomers, at least one of said monomers having a polymerizable olefinic moiety and a group attached to said moiety and having at least one adsorptively active element in said group, sufficiently to form a linear polymeric intermediate of at least 6 carbons on the chain and having a plurality of groups thereon containing an adsorptively active element therein, reacting the polymeric intermediate with at least one substance having properties sufficient to change the valence of said adsorptively active element and form a desired linear, adsorptively active compound having a plurality of adsorptively active groups attached to the chain thereof as substituents, and applying without curing said compound to said metal in a corrosion-inhibiting amount; said adsorptively active groups being adsorptively active with respect to said metal.

25. The method defined in claim 24 wherein said adsorptively active element comprises sulfur.

26. A method for inhibiting corrosion of a metal subject thereto, which method comprises applying without curing to said metal, in a corrosion-inhibiting amount, at least one linear polymer having a plurality of adsorptively active groups attached to the chain thereof as substituents; said adsorptively active groups being adsorptively active with respect to said metal; said polymer being the product of polymerization of olefinic unsaturation of monomers, each of said monomers having a polymerizable olefinic moiety and at least one of said monomers having at least one adsorptively active group attached to said moiety, each group containing an adsorptively active element, followed by reaction of the polymerization product with at least one substance having properties sufficient to change the valence of said adsorptively active element and form said polymer.

27. A method for inhibiting corrosion of a metal subject thereto, which method comprises applying without curing to said metal, in a corrosion-inhibiting amount, at least one linear polymer having a plurality of adsorptively active groups attached to the chain thereof as substituents, said groups containing sulfinyl groups and being adsorptively active with respect to said metal; said polymer being the product of polymerization of olefinic unsaturation of monomers, each of said monomers having a polymerizable olefinic moiety and at least one of said monomers having at least one adsorptively active group attached to said moiety and containing a thio group, followed by the oxidation of said thio group to a sulfinyl group.

28. A method for inhibiting corrosion of a metal subject thereto, which method comprises applying without curing to said metal, in a corrosion-inhibiting amount, a long chain linear hydrocarbon having thereon as substituents a plurality of adsorptively active groups containing at least one sulfinyl group; said adsorptively active group being adsorptively active with respect to said metal.

29. A method for inhibiting corrosion of a metal subject thereto, which method comprises applying without curing to said metal, in a corrosion-inhibiting amount, a long chain linear hydrocarbon of at least six carbons having thereon as substituents a plurality of adsorptively active alkyl sulfinyls.

30. A method for inhibiting corrosion of a metal subject thereto, which method comprises applying without curing to said metal, in a corrosion-inhibiting amount, a long chain linear hydrocarbon of at least six chain carbons having thereon as substituents at least three adsorptively active groups each containing adsorptively active nitrogen; and exposing said metal to a corrosive environment such that said hydrocarbon having said absorptively active groups inhibits corrosion.

31. The method defined in claim 30 wherein adsorptively active nitrogen is present as amino.

References Cited

UNITED STATES PATENTS

| | | | |
|---|---|---|---|
| 2,776,263 | 1/1957 | Hiskey et al. | 252—390 |
| 2,850,461 | 9/1958 | Bloch et al. | 252—390 |
| 2,927,864 | 3/1960 | Shotton | 106—287 |
| 2,964,483 | 12/1960 | Johnson et al. | 260—22 |
| 3,013,926 | 12/1961 | Railsback et al. | 117—132 X |
| 3,060,060 | 10/1962 | Shotton et al. | 117—132 |
| 3,140,196 | 7/1964 | Lacy et al. | 117—75 |

FOREIGN PATENTS

| | | |
|---|---|---|
| 1,075,022 | 7/1960 | Germany. |

OTHER REFERENCES

Sakurai, et al., Bull. Chemical Society of Japan, June 6/3, vol. 36 #6 pp. 751–753.

RALPH S. KENDALL, Primary Examiner

U.S. Cl. X.R.

117—161; 252—390, 395; 260—29.6, 79.5, 86.7, 88.3, 89.7, 293